US007953884B2

(12) United States Patent
Agarwal et al.

(10) Patent No.: US 7,953,884 B2
(45) Date of Patent: May 31, 2011

(54) METHOD AND APPARATUS FOR OVERLOAD CONTROL AND AUDIT IN A RESOURCE CONTROL AND MANAGEMENT SYSTEM

(75) Inventors: Anjana Agarwal, Wheaton, IL (US); Craig R. Lothridge, Naperville, IL (US); Maridi Raju Makaraju, Bolingbrook, IL (US); Jakob J. Neulist, West Chicago, IL (US); Sam X. Tao, New York, NY (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 782 days.

(21) Appl. No.: 11/784,710

(22) Filed: Apr. 9, 2007

(65) Prior Publication Data

US 2008/0250156 A1  Oct. 9, 2008

(51) Int. Cl.
*G06F 15/16* (2006.01)

(52) U.S. Cl. ........ 709/235; 709/225; 709/226; 709/223; 370/216; 370/400; 370/252

(58) Field of Classification Search ................... 709/235, 709/230, 223, 225–226; 370/216, 400, 252
See application file for complete search history.

(56) References Cited

U.S. PATENT DOCUMENTS

| | | | | |
|---|---|---|---|---|
| 5,881,050 | A * | 3/1999 | Chevalier et al. | 370/230 |
| 6,038,214 | A * | 3/2000 | Shionozaki | 370/230 |
| 6,879,820 | B2 * | 4/2005 | Bjelland et al. | 455/406 |
| 2004/0028209 | A1 * | 2/2004 | Fleming et al. | 379/221.13 |
| 2004/0240389 | A1 | 12/2004 | Bessis et al. | |
| 2005/0036442 | A1 * | 2/2005 | Saleh et al. | 370/216 |
| 2005/0124341 | A1 * | 6/2005 | Myllymaki et al. | 455/435.1 |
| 2006/0140198 | A1 | 6/2006 | Majeed et al. | |
| 2007/0066286 | A1 * | 3/2007 | Hurtta | 455/414.1 |
| 2007/0072605 | A1 * | 3/2007 | Poczo | 455/432.2 |
| 2007/0162599 | A1 * | 7/2007 | Nguyen | 709/225 |
| 2007/0180113 | A1 * | 8/2007 | Van Bemmel | 709/226 |
| 2007/0297329 | A1 * | 12/2007 | Park et al. | 370/230.1 |

OTHER PUBLICATIONS

PCT/US2007/026022, International Search Report, mailed Aug. 12, 2009 (5 pages).
PCT/US2007/026022, Written Opinion of the International Searching Authority, mailed Aug. 12, 2009 (6 pages).
ITU-T H.248.11, Series H: Audiovisual and Multimedia Systems—Infrastructures of Audiovisual Services—Communication Procedures, Gateway Control Protocol: Media Gateway Overload Control Package, Nov. 29, 2002 (24 pages).
ITU-T H.248.36, Series H: Audiovisual and Multimedia Systems—Infrastructures of Audiovisual Services—Communication Procedures, Gateway Control Protocol: Hanging Termination Detection Package, Sep. 13, 2005 (12 pages).

(Continued)

*Primary Examiner* — Wing F Chan
*Assistant Examiner* — Benjamin M Thieu
(74) *Attorney, Agent, or Firm* — Fay Sharpe LLP

(57) ABSTRACT

A system and method for resource control management implementing Diameter protocol is disclosed. The system includes a border gateway which is configured to send an overload message and a controller that is acting as a Diameter protocol server which is configured to receive the overload message and block a number of calls to the border gateway. The controller would also be configured to perform an audit function which includes clearing media resource ports. The overload message sent by the border gateway may also include a reduction percentage, which will dictate the percentage of calls which will be blocked.

17 Claims, 7 Drawing Sheets

OTHER PUBLICATIONS

3GPP TSG-CT WG4 C4-051467, Change Request 29.232, CR 302, rev-, version 6.3.0, Clean-up of Hanging Contexts and Terminations, Alcatel, 3GPP TSG-CT WG4 Meeting #29, Berlin, Germany, Oct. 31-Nov. 4, 2005 (10 pages).

ITU-T H.248.10, Series H: Audiovisual and Multimedia Systems—Infrastructures of Audiovisual Services—Communication Procedures, Gateway Control Protocol: Media Gateway Resource Congestion Handling Package, Jul. 1, 2001 (10 pages).

ITU-T H.248.32, Series H: Audiovisual and Multimedia Systems—Infrastructures of Audiovisual Services—Communication Procedures, Gateway Control Protocol: Detailed Congestion Reporting Package, Jan. 5, 2005 (14 pages).

Draft ETSI TR XXX XXX, 0.0.15a, H.248 Non-Call Related Procedures and Management System Interaction, TISPAN NGN Release 1, Dec. 1, 2006 (60 pages).

ETSI TS 129 232, V6.8.0, 3GPP TS 29.232, version 6.8.0, Release 6, Universal Mobile Telecommunication System (UMTS); Media Gateway Controller (MGC)—Media Gateway (MGW) Interface; Stage 3 H.248 Non-Call Related Procedures and Management System Interaction, TISPAN NGN Release 1, Dec. 1, 2006 (76 pages).

* cited by examiner

US 7,953,884 B2

METHOD AND APPARATUS FOR OVERLOAD CONTROL AND AUDIT IN A RESOURCE CONTROL AND MANAGEMENT SYSTEM

This application claims the priority benefit of U.S. application Ser. No. 11/648,257, filed Dec. 29, 2006, the disclosure of which is incorporated herein by reference.

BACKGROUND OF THE DISCLOSURE

This disclosure relates to a method and apparatus for overload control and audit in a resource control and management system. More particularly, this disclosure relates to a method and apparatus for controlling and managing resources of a system with Diameter protocol.

While the disclosure is particularly directed to resource management using Diameter protocol and will be thus described with specific reference thereto, it will be appreciated that the disclosure may have usefulness in other fields and applications. For example, this disclosure may be used in other types of protocol, including but not limited to Radius, etc. This disclosure may also be useful in other types of data transfer systems where system control and bearer processing are separated.

By way of background, the Internet protocol Multimedia Sub-system (IMS) standard defined by the 3rd Generation Partnership Project (3GPP), is a framework for real time multimedia communications using Internet Protocol (IP) networks. The Diameter protocol was developed in order to provide an authentication, authorization and accounting (AAA) framework for applications that require network access. Diameter protocol generally provides a highly reliable mechanism for a client to obtain permission from a server for using network resources.

Diameter protocol provides a primary framework through which administrators may control the access at the entry point of a network which is often the purpose of an access server. AAA authenticates, or identifies a user, authorizes, or determines what the user can do and how much network resources the user can use, and monitors the usage of resources in the form of connecting time or total volume of data flow for billing purposes. Other protocol, such as Radius, store the AAA information in external databases or on remote servers. However, Diameter protocol handles many of the AAA applications internally. Diameter is also peer to peer bi-directional which enables push and pull application models into architectures. The base Diameter protocol provides a useful foundation that can be extended in order to provide resource control and management functions for services such as IMS.

Diameter protocol, however, has not often been widely used in resource control and management systems. Generally, Diameter protocol is used in the form of query and response. When Diameter protocol is used for telecommunication, there are virtually no safeguards for controlling Media resources. Diameter protocol in its current form does not provide any mechanism for a resource management system to check the usage levels of resources and to synchronize states of multimedia sessions set on a gateway and on its controller.

Therefore, there is a need in the industry for Diameter protocol to be extended to support audits and overloads in order to manage the border gateways associated with the resource management system.

The present disclosure contemplates a new method and apparatus that resolves the above-referenced difficulties and others.

SUMMARY OF THE INVENTION

The method and apparatus for resource management with Diameter protocol are provided. This disclosure will allow for resource management in the form of Diameter supporting overload and audit functions.

In one aspect of the disclosure, the method includes performing an audit sequence in response to a trigger. The audit sequences includes clearing and releasing resources that are not fully or correctly connected, detecting an overload status from an overloaded gateway that has taken access load, determining a reduction percentage that corresponds with the percent of new sessions that will be blocked, and blocking sessions that intend to use the overloaded gateway with respect to the reduction percentage.

In accordance with another aspect of the present disclosure, the method further includes determining the reduction percentage based at least in part on central processing unit (CPU) usage, the system memory usage, and the bandwidth usage of physical links connected to a specific destination.

In accordance with another aspect of the present disclosure, the method further includes that overload status be based at least in part on the quality of service (QoS), such as delay, jitter, and packet loss, measured by the gateway.

In accordance with another aspect of the present disclosure, the method further includes redirecting a blocked call to an alternative gateway. In accordance with another aspect of the present disclosure, the method further includes identifying incoming emergency calls and granting priority for the emergency calls, preventing them from being blocked.

In accordance with yet another aspect of the present disclosure, the method further includes disabling the trigger for audit while the gateway is in overload status.

In accordance with yet another aspect of the present disclosure, the method further includes performing an audit sequence in response to a trigger where the trigger is related to a timer.

In accordance with another aspect of the present disclosure, the method further includes the trigger being based at least in part to the QOS.

In accordance with another aspect of the present disclosure, the system is a resource control and management system with Diameter protocol comprising a border gateway acting as a client configured to send overload messages and a controller acting as a server configured to receive overload messages originated from the border gateway, throttle new sessions on the overloaded gateway, and perform an audit function which includes clearing media resource ports.

In accordance with yet another aspect of the present disclosure, the system further includes a Proxy Call Session Control Function (P-CSCF) configured to forward session control messages received from User Equipment (UE). The P-CSCF can be an Application Function supporting HTTP/SIP connection to the PDF e.g. download video to the UE.

In accordance with another aspect of the present disclosure, the system includes the controller being configured to communicate the overload and audit messages to the PDF In accordance with another aspect of the present disclosure, the system further includes the Policy Decision Function (PDF) being configured to receive the overload message and reduce the number of calls by a reduction percentage, the reduction percentage being established by the border gateway.

In accordance with yet another aspect of the present disclosure, the system further includes the controller being configured to reduce the number of calls by a reduction percentage.

In another aspect of the present disclosure, the system further includes that the controller is a PDF.

In accordance with yet another aspect of the present disclosure, the system further includes that the controller is a Policy Charging and Rule Function (PCRF).

In accordance with another aspect of the present disclosure, a system comprises of a gateway configured to communicate an overload status message and a Diameter server configured to receive the overload status message, reduce the rate of new sessions to be routed through the system.

In accordance with another aspect of the present disclosure, the system includes the overload status message including a reduction percentage that dictates the percentage of total new sessions that will be blocked and not routed through the gateway.

In accordance with yet another aspect of the present disclosure, the system further includes a Diameter client that is a BGF.

In accordance with yet another aspect of the present disclosure, the system further includes a Diameter server that is a PCRF.

In accordance with yet another aspect of the present disclosure, the system includes a Diameter server that is a PDF.

DESCRIPTION OF THE DRAWINGS

The presently described embodiments exists in the construction, arrangement, and combination of the various parts of the device, and steps of the method, whereby the objects contemplated are attained as hereinafter more fully set forth, specifically pointed out in the claims, and illustrated in the accompanying drawings in which:

DETAILED DESCRIPTION

Figure 1:
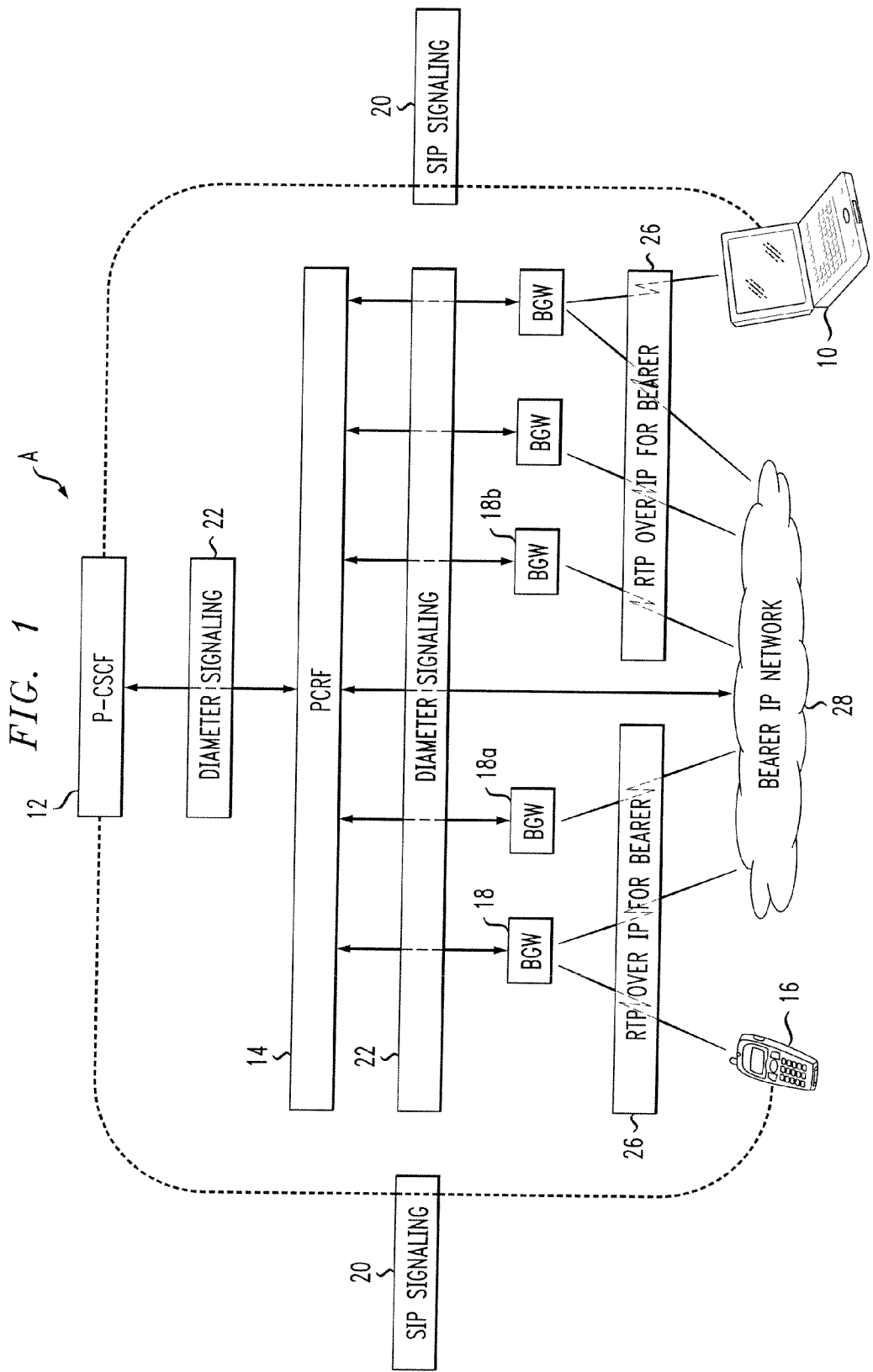
FIG. 1 illustrates a portion of the overall communications network, including UE, Diameter server, Diameter client and gateways.

Referring now to the drawings wherein the showings are for purposes of illustrating the disclosed embodiments of the disclosure only and not for purposes of limiting same, FIG. 1 provides an overall view of a system into which the present disclosure may be incorporated. A communications infrastructure A is shown. The communications infrastructure A includes UE 10, 16, P-CSCF 12, a controller 14, and a plurality of border gateways 18. It should be understood that this represents but one embodiment of the communications network infrastructure A. The present disclosure could be incorporated in a variety of communication network configurations.

In operation, as described in greater detail below, the presently described embodiments include a method of managing a load of associated sessions for border gateway resources with Diameter protocol. The present disclosure allows for Diameter protocol to be extended to support audits and overload of the border gateways. Although Diameter protocol was designed for query and response, Diameter protocol is now being extended to manage bearer sessions to the border gateway. The system and method disclosed allows for audits and overloads which act to maintain a manageable load for border gateway resources.

Still referring to FIG. 1, the UE 10 and 16 could be associated with a variety of different communication devices, including, but not limited to wireless phone, Voice over IP (VoIP) telephone, a laptop computer, a desktop computer, a Wi-Fi phone, etc. These end devices are typically consumer premise equipment (CPE) used to communicate through compatible lines. These user equipment 10 and 16 are connected to corresponding network elements.

In this embodiment the UE 10 and 16 are provisioned with the IP address of P-CSCF 12 using Session Initiation Protocol (SIP) for signaling 20. It can also use Dynamic Host Configuration Protocol (DHCP) to get the P-CSCF IP address. The P-CSCF assigns border gateways 18 for bearer 26 to UE 10 and 16 depending on multiple factors like location of the UEs. As described in further detail below, these communication networks may include other network elements, for examples, switches, gateways, etc. Examples of possible communication networks include public switch telephone networks (PSTN), cellular networks, VoIP networks, the internet, the intranet, etc. Continuing on with FIG. 1, P-CSCF 12 is in communication with the controller 14 which is acting as a Diameter server. Communication is facilitated through Diameter signaling 22. In this embodiment the controller is represented by the PCRF 14. However, it should be appreciated that the PCRF may be substituted for a PDF.

In this embodiment, the controller is in communication with a plurality of border gateways 18. Again the communication is facilitated through Diameter signaling 22. The border gateway 18, in turn, is in communication with UE 10, 16 through the IP network 28. The border gateways 18 communicate with UE 10, 16 and within themselves using Real-time Transport Protocol (RTP) 26. When other types of non-real time data are exchanged between UE 10, 16 and border gateways 18, other transport layer protocols, such as Transmission Control Protocol (TCP), may also be used. RTP 26 provides end-to-end network transport functions suitable for applications transmitting real-time data. However, RTP 26 does not facilitate resource reservation and does not warrant QoS for real-time services.

In this embodiment UE 16 is illustrated as a cellular phone. In operation the communications infrastructure A is used to manage bearer sessions to access gateways. Through this disclosure Diameter protocol is used to extend support of audits and overloads. The controller 14 will act as the Diameter protocol server as the border gateways 18 and P-CSCF 12 will act as Diameter clients. If a gateway goes into overload, the gateway will be configured to communicate its overload status.

A border gateway 18 may go into overload through a variety of different methods, thereby overload status can be triggered through a variety of different scenarios. In one embodiment, overload status is based, at least in part, due to the CPU utilization on gateway 18. If the CPU usage goes over a threshold, overload status would be triggered and communicated from the gateway 18 to the PCRF 14. In another embodiment, overload status is related in part to the availability of memory on gateway 18. If the available memory falls below a threshold, the overload status is triggered. In another embodiment, overload status is related to the amount of bandwidth used on a physical facility for bearer traffic destined to a specific destination. Once the amount of bandwidth used by the gateway 18 on that specific facility reaches a critical value, the overload status would be invoked. In turn, the overload status message would be sent from the gateway 18 to the PCRF 14. In yet another embodiment, the amount of session set on the gateway may also be the trigger for overload.

The overload status message, which is communicated between network elements, may include a reduction percentage. The reduction percentage corresponds to the percent of new sessions that will be blocked and, in turn, not sent through the corresponding gateway. This reduction percentage may be determined through a variety of methods. In one embodiment, the reduction percentage is based, at least in part, on the available CPU memory. In which case, it will follow that the greater the available CPU, the lower the reduction percentage and vice versa. In this form, a greater percentage of sessions would be blocked whenever there is a lower amount of CPU memory available to support the setup and maintenance of the sessions.

In another embodiment, it is not desirable to block all incoming sessions. In this situation, certain sessions, e.g., emergency calls, may be granted a higher priority, preventing them from being blocked. A session may be granted higher priority through a variety of methods known in the art. These high priority sessions may include calls to emergency services or sessions originated from or to users subscribing premier service plans which may be recognized through such means as caller identification. Emergency services may include the local police department, fire department, hospitals, etc.

Sessions would be blocked randomly, with the exclusion of high priority sessions, by arrival time. For example, if the reduction percentage is 10% the controller 14 may block every tenth session. However, in the situation where the tenth session is a high priority session, then the next non-high priority session would be blocked. In another embodiment, the reduction percentage may be 20%. In which case the controller 14 would block every fifth call and so forth.

The system may also include another Diameter client, for example, a P-CSCF 12. This piece of network equipment would be configured to forward messages received from user equipment 10. P-CSCF may also be responsible, at least in part, for scheduling fewer calls in response to the reduction percentage. The implementation of throttling or blocking either on P-CSCF or PCRF is known in the art.

Still referring to FIG. 1, the Diameter server may be configured to perform an audit sequence on a port basis. The audit sequence may be performed in response to a trigger. In this form, a trigger may be implemented through a variety of methods. In one embodiment, the trigger is a timer. In this case, a timer may go through a count. When the count has reached a critical mass, the audit procedure would be invoked. In another form, the trigger may be based on QoS. In this embodiment, the trigger will be relative to the efficiency of the system. Thereby, if the system is running relatively error free, the audit procedure would not be triggered as often. The trigger may also be a combination of QoS and timer. In this form, the timer would be set to a relatively high number when QoS is high and a lower number when QoS is not as high.

In another embodiment, the trigger is disabled while the gateway is in overload status. In this form, the audit sequence would not be invoked while the gateway is in overload, even if the trigger normally would be set off. Disabling the trigger while the gateway 18 is in overload, allows for the system to clear the overload before attempting an audit sequence. Generally, while an audit sequence is being performed, the system will tie up resources associated with the gateway. Therefore, in many situations, it will be beneficial to run an audit sequence only when the gateway 18 is not in overload status. However, it is not required to perform the auditing sequence only after the overload condition is checked. The implementation may vary depending on how the system is used. The details to performing an overload procedure are outlined in the methods below.

Figure 2:
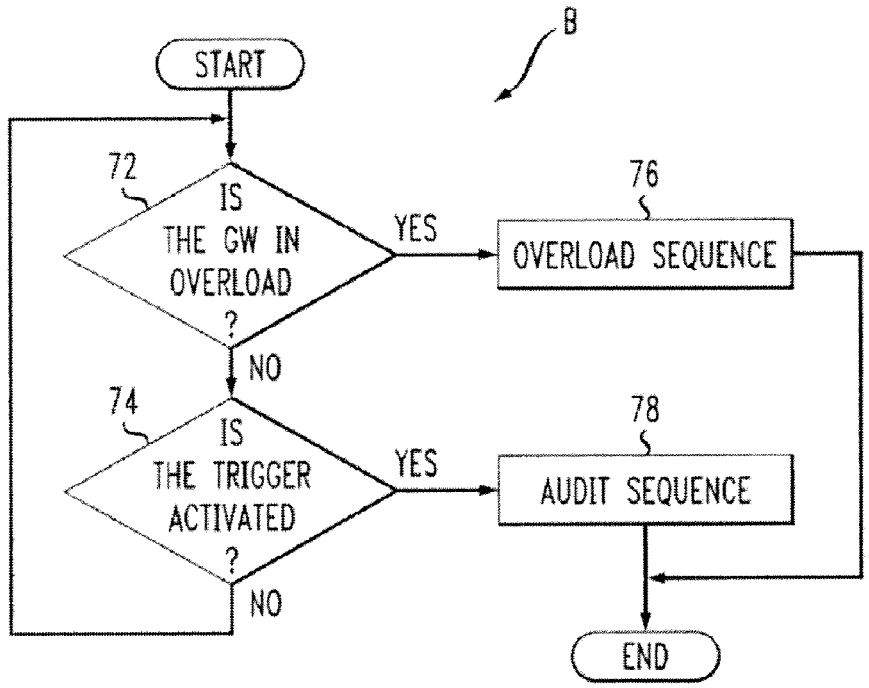
FIG. 2 is a flow chart illustrating the overall method according to the present disclosure.

Now referring to FIG. 2, a method of audit resource control in a system implementing Diameter protocol is disclosed. It should be understood that the method may be implemented by a variety of software and hardware configurations. In one embodiment, the software implementing method B resides on a Diameter client or Diameter server network element. In this embodiment, the Diameter client or Diameter server element communicates with UE in order to create a call network path. It should be understood that suitable software/hardware implementing the embodiments of the invention may also be distributed on appropriate network elements.

The method B includes determining if the system is in overload status. When a gateway has taken on too much bandwidth, overload status may be invoked. This step (at 72) determines if the system is in overload status. If the system is in overload status, the method B continues with the overload sequence (at step 76). The overload sequence is detailed in FIG. 5 discussed below.

The overload and audit trigger are independent activities but they can be combined depending on the implementation. The trigger determines if the audit sequence should be invoked. If the trigger is activated (at step 74) the audit sequence would be invoked (at step 78). The audit sequence is detailed below at FIG. 4. If the trigger is not activated (at step 74), the method continues to monitor the system for overload status and/or if the trigger is activated. Audit sequence can be triggered in many ways, e.g. a global timer or a individual timer is started when the termination is created. If either the overload sequence (at step 76) and/or audit sequence (at step 78) is activated, once the sequence is performed the method ends.

Figure 3:
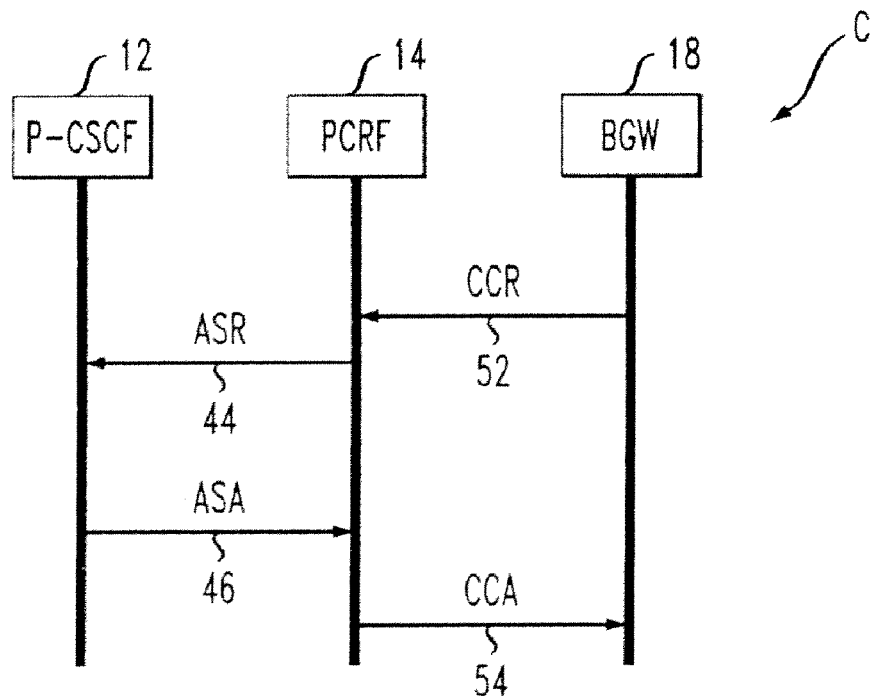
FIG. 3 is a flow chart illustrating the release sequence.

Now referring to FIG. 3, a method of release sequence is shown generally at C. Generally, media ports are released through these two methods when implemented properly. A method in which the border gateway initiates the audit sequence is disclosed. The border gateway 18 (FIG. 1) would send a Credit Control Request (CCR) 52 to the PCRF 14 upon receiving an internal audit trigger. The PCRF would check if the session is active at the PCRF 14. If it is active then no action is taken. A CCA message is returned to inform the border gateway 18 to continue with the call. If the PCRF 14 does not have an indication on the session, this in turn would trigger the PCRF 14 to send a CCA message 110 to the border gateway 18. An ASR is followed after the CCA to clean up the hanging termination at the border gateway 18.

In certain situations sometimes the release sequence does not operate properly. In situations such as this, the border gateway 18 may have an open session signaling that a call is up, but the controller 14 does not have indication for the session. In another situation, the controller 14 may have dynamic data block associated with the session, but the border gateway 18 has released the bearer port. In another situation, the border gateway 18 and controller 14 have session data associated with the session, but the P-CSCF 12 does not have data associated with that session. In these situations, an audit sequence may be necessary in order to "clean up" the system and release the resources that are associated with an improperly connected call.

Figure 4:
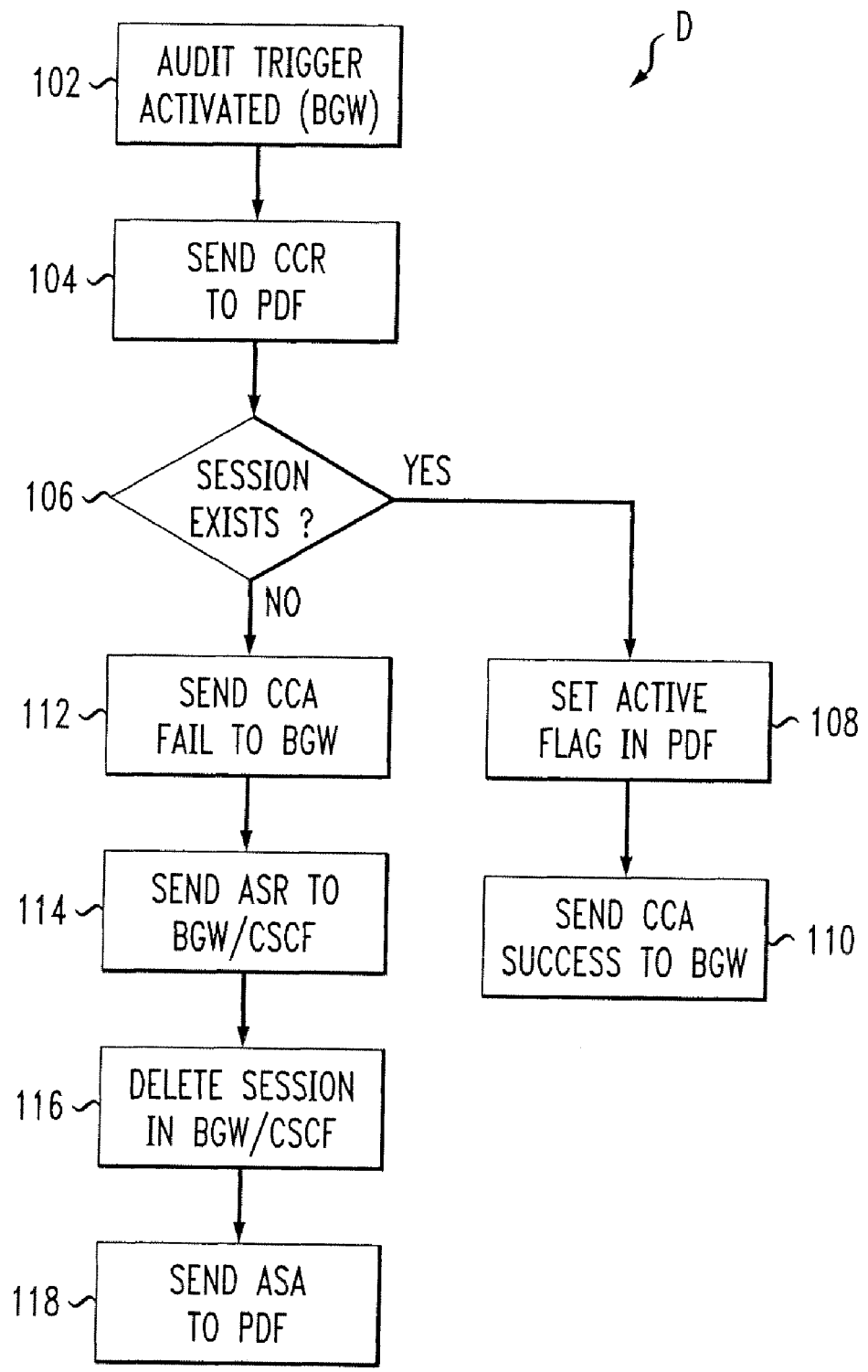
FIG. 4 is a flow chart illustrating one embodiment of the audit sequence.

Now referring to FIG. 4, an audit sequence is shown generally at D. It should be understood that the method may be implemented by a variety of software and hardware configurations. In one embodiment, the software implementing method D resides on Application Functions (AF) within the system. These AFs may be a variety of Diameter clients like the P-CSCF. In another embodiment, the software implementing method D resides on the Diameter server. In another embodiment, the software implementing the method D is distributed on many appropriate network elements.

Figure 5:
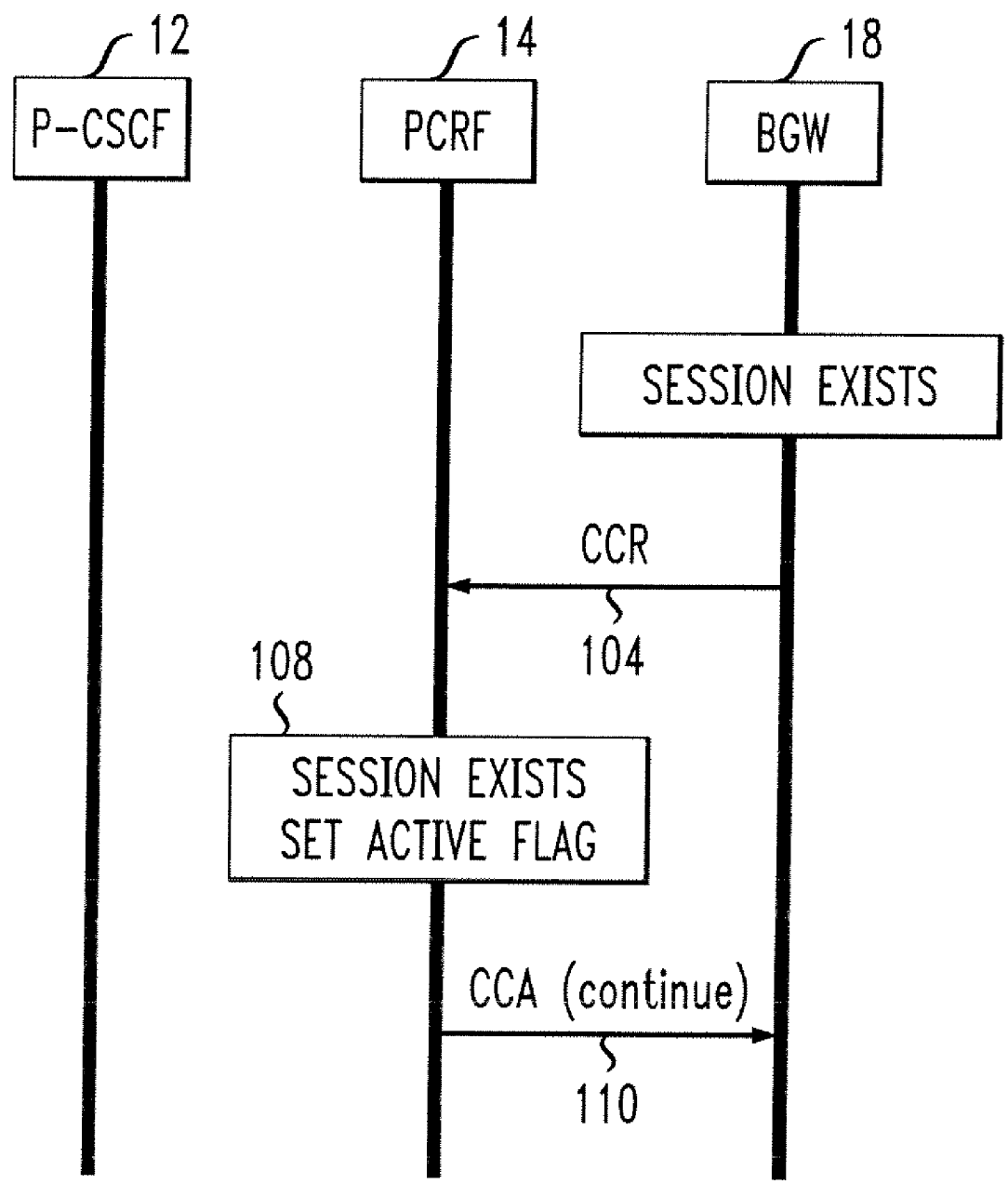
FIG. 5 is an example of the audit sequence when no cleanup is needed.

The method D includes a CCR 52 being sent from the border gateway 18 to the PCRF 14 when a session exists, when the trigger is activated (at steps 102 and 104). In one embodiment this happens when the timer expires. In another embodiment the timer is set at the start of a session. In the illustrated embodiment, the call may not be properly connected, thereby invoking a clean up response. If the session exists on the PCRF (at step 106) then no clean up is needed, an active flag is set (at step 108), and a acknowledgement is sent to keep the session active (at step 110). This situation is illustrated in FIG. 5.

Figure 6:
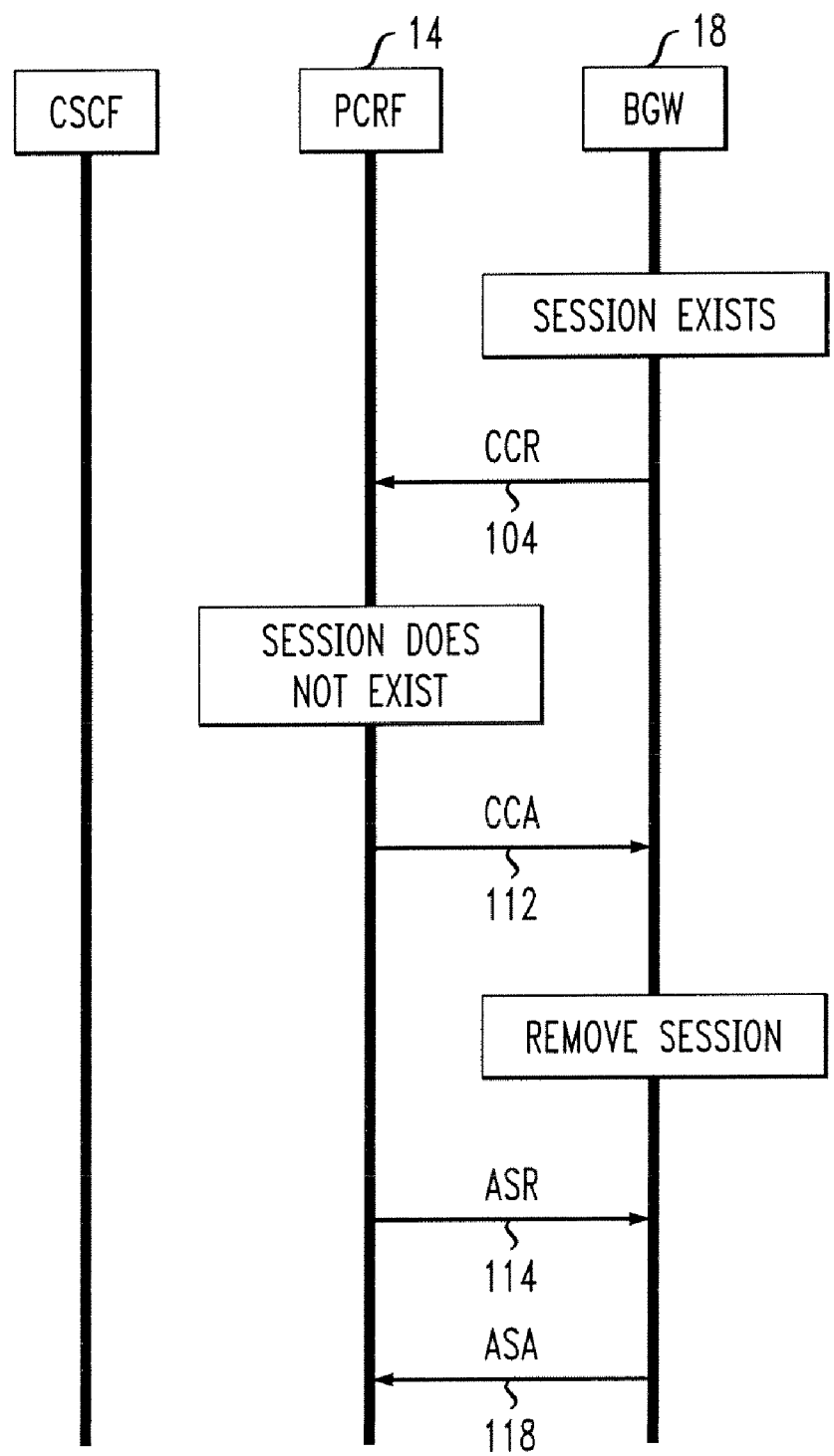
FIG. 6 is an example of the audit sequence when clean is required.

In another situation, the session does not exist on the PCRF 14. This situation is shown in FIG. 6. In this situation, the session is removed and the network elements are freed in order to take another call. This will make more network resources available and prevent an overload from occurring at the border gateway 18. The PCRF 14 would then send a CCA 54 to the border gateway 18 (at step 112). The PCRF 14 would remove the session (at step 116) by the sending an ASR 44 to the border gateway 18 (at step 114). Again the border gateway 18 would send an acknowledgement 46 back to the PCRF 14 (at step 118). Auditing may start cleaning up if the session set on border gateway 18 is considered not valid by P-CSCF 12. If the session is also valid on P-CSCF, there may be no additional tasks or Diameter messages.

Figure 7:
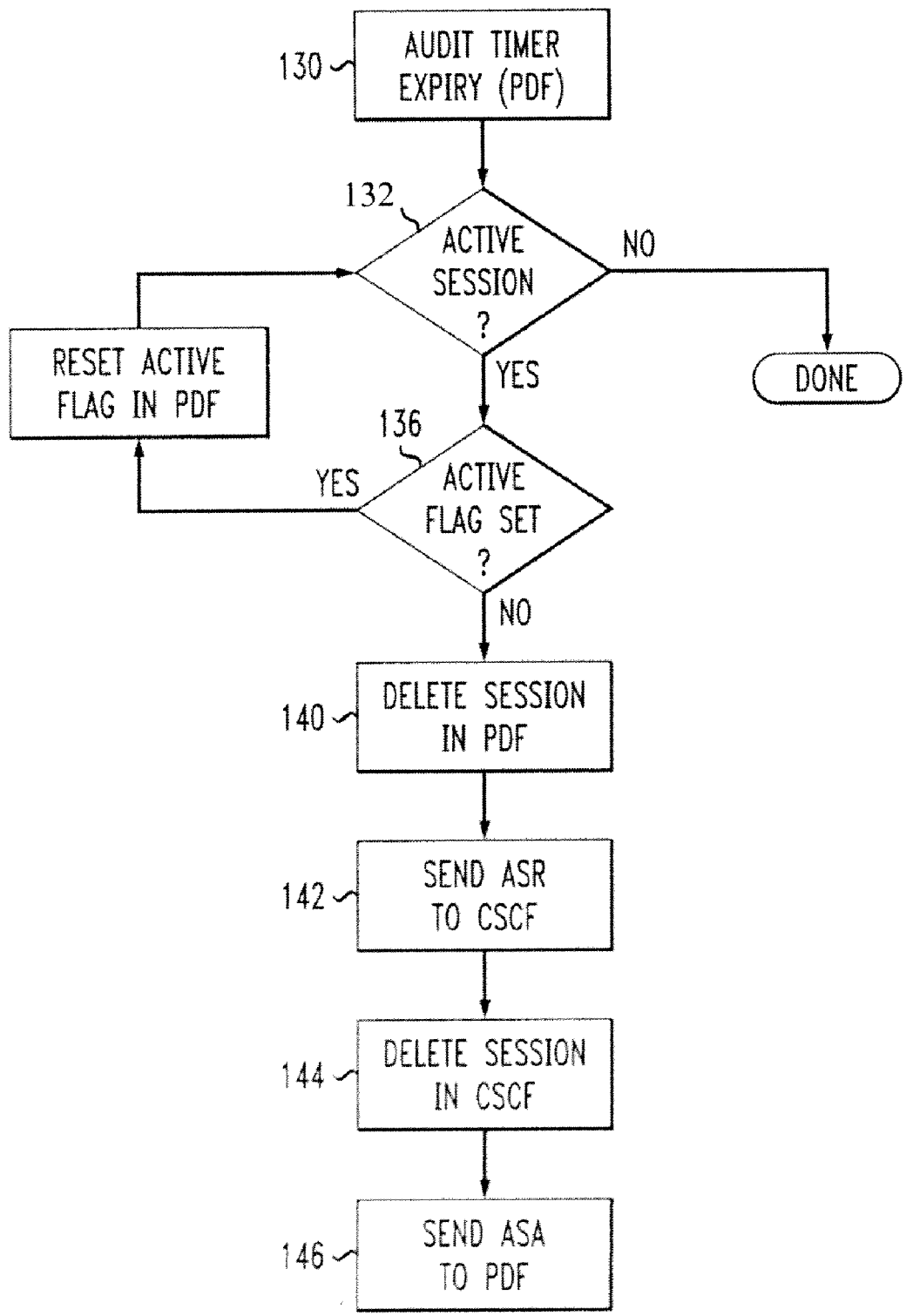
FIG. 7 is a flow chart illustrating another embodiment of the audit sequence.

Now referring to FIG. 7, the audit sequence can also be initiated by the PCRF 14. The PCRF 14 sends an CCR 104 (FIG. 5 and FIG. 6) to border gateway 18 and P-CSCF 12 to check if the session is still active when the trigger is activated (at step 130). If it is not active on the border gateway 18 or P-CSCF 12, the session is released using the ASR/ASA messages 114, 118.

If the session is active (at step 132) and the active flag is not set (at step 136) cleanup may be required. In this situation the session is deleted (at step 140) in the PDF. The PCRF would then send an ASR to the CSCF (at step 142). The session would then be deleted in the CSCF, freeing up the resource (at step 144) and an acknowledgement would then be send back to the PCRF (at step 146).

Figure 8:
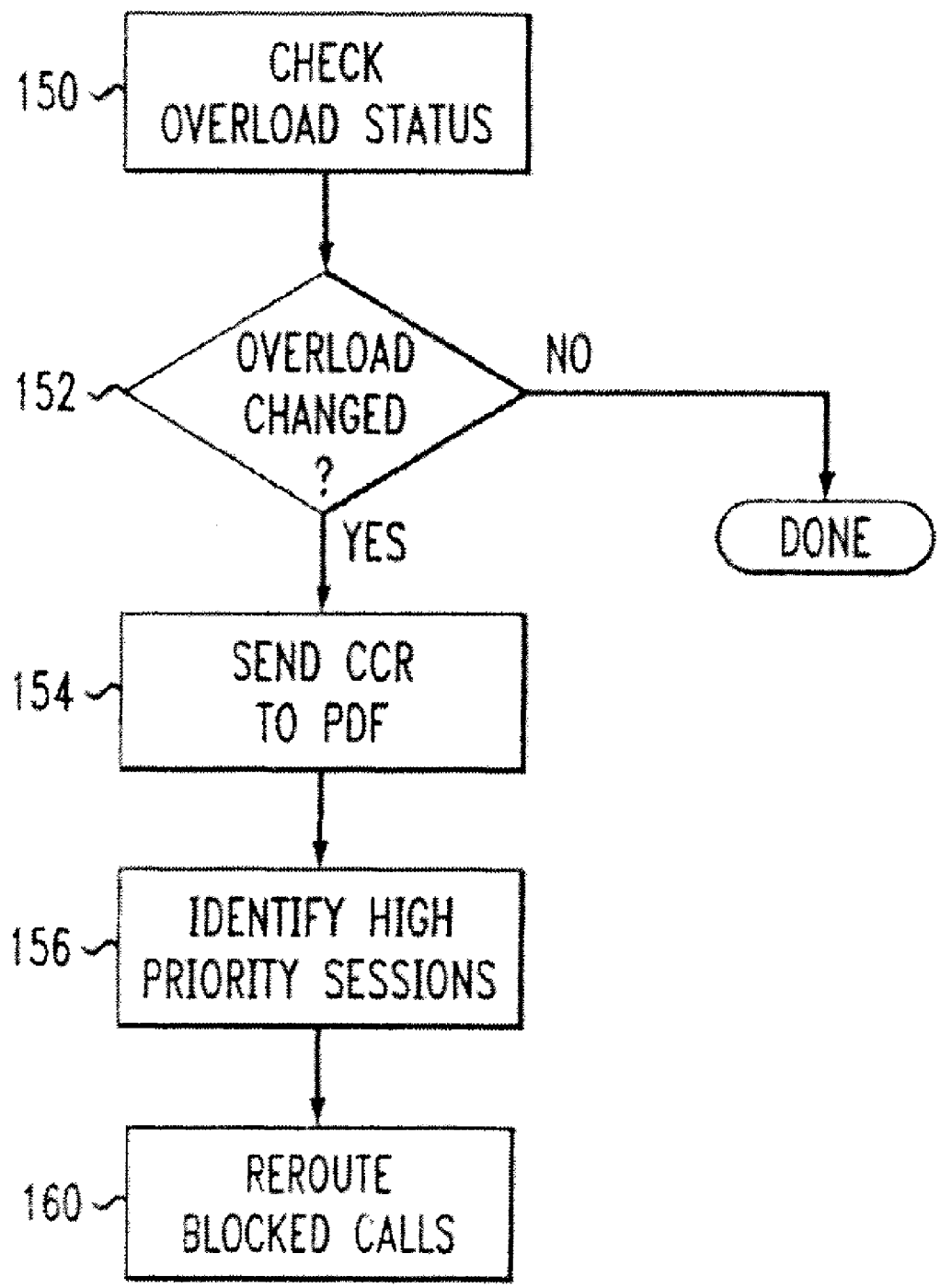
FIG. 8 is a flow chart illustrating the overload method according to the present disclosure.

These audit sequences may be invoked whenever the trigger is initiated (at step 130). In one embodiment, the trigger will be disabled any time that the border gateway 18 is in overload status. This is but one example of an audit sequence, however, there are numerous ways to perform an audit sequence, which are known in the art and fall under the scope of this disclosure. Now referring to FIG. 8, a method of overload resource management is disclosed. The method F begins with checking the overload status (at step 150). The overload status is generally sent from the border gateway 18 to the controller 14. This will notify the system that the border gateway is in overload and that steps need to be taken. If the overload status not has changed (at step 152), no steps need to be taken. If the overload status has changed (at step 152), the border gateway 18 may send a CCR message to the PCRF (at step 154).

The overload message may also include the reduction percentage. The reduction percentage would correspond to the percentage of calls that would be blocked from entering the corresponding gateway. In this form, a gateway may be relieved from overload status because fewer calls are being routed through that gateway 18. If the reduction percentage reaches close to 100%, almost no calls will be allowed through that gateway, which will eventually allow the gateway 18 to be relieved of overload status.

Reduction percentage may be based on a variety of factors. One factor may be the amount of memory available at the CPU. In this case, if there is a larger amount of memory available, the reduction percentage may be lower. In the alternative, if there is relatively little memory available at the CPU, the reduction percentage may be higher in order to decrease the load going through the gateway. The reduction percentage may also be based on the amount of bandwidth used The method F continues with identifying high priority status sessions (at step 156). High priority status sessions, e.g., emergency calls, may be identified through a number of methods known in the art. For example, emergency calls may be any call going to or from an emergency service number. Emergency service numbers may includes the police department, the fire department, the hospital, etc. Emergency calls may also be identified via response to an emergency situation. For example, if there is a natural disaster in an identified calling area, all calls to or from that area may be identified as emergency calls.

The method F continues with blocking a percentage of calls (at step 58). These calls may be blocked by arrival. For example, if the reduction percentage call for 10% of the calls to be blocked, every tenth arriving call may be blocked. Calls that have been identified as emergency calls, may be exempt from being blocked. In which case, if a call that would normally be blocked is an emergency call, that call may not be blocked and another call would be blocked in its place.

The method concludes with rerouting blocked calls (at step 160). Because the calls that were blocked are not routed through the corresponding border gateway 18, it may be necessary to reroute these blocked calls through a different border gateway 18*a* and 18*b*. However, because calls are often assigned to the border gateway in a sequential order, often times when one border gateway is in overload, many or all of the gateways are in overload. This, however, is not always the case. Often times overload may be based on an error somewhere in the system that only affects one or relatively few border gateways. If this is the case, many of the calls that were intended for the faulty gateway may be rerouted to alternate gateways. In one embodiment, if calls are not able to be rerouted those calls are simply dropped.

The above description merely provides a disclosure of particular embodiments of the invention and is not intended for the purposes of limiting the same thereto. As such, the disclosure is not limited to only the above-described embodiments. Rather, it is recognized that one skilled in the art could conceive alternative embodiments that fall within the scope of the disclosure.

We claim:

1. A resource control and management system, comprising:
   a border gateway acting as a client for Diameter protocol configured with an overload extension to the Diameter protocol to send an overload message; and
   a controller acting as a server for Diameter protocol configured with the overload extension to receive said overload message from said border gateway, block a number of sessions to said border gateway and configured with an audit extension to the Diameter protocol to perform an audit sequence, said audit sequence including clearing media resource ports, wherein said controller is configured to reduce the number of calls by a reduction percentage, said reduction percentage is established by said border gateway; and wherein determining the reduction percentage is based, at least in part, on available central processing unit memory.

2. The system according to claim 1, further comprising a proxy call session control function configured to forward messages received from user equipment.

3. The system according to claim 2, wherein said controller is configured to communicate said overload message to said proxy call session control function.

4. The system according to claim 3, wherein said proxy call session control function is configured to receive said overload message and reduce the number of calls by a reduction percentage, said reduction percentage is established by said border gateway.

5. The system according to claim 1, wherein said controller is a policy decision function.

6. The system according to claim 1, wherein said controller is a policy charging and rule function.

7. A resource control and management system comprising:
   a gateway configured to communicate an overload status message; and
   a Diameter server configured with an overload extension to a Diameter protocol to receive said overload status message, reduce the rate of calls to be routed through said system and configured with an audit extension to the Diameter protocol to perform an audit sequence on a port basis in response to a trigger,
   wherein said overload status message includes a reduction percentage that dictates the percentage of total received calls that will be blocked and not be routed through said gateway; and
   wherein determining the reduction percentage is based, at least in part, on available central processing unit memory.

8. The system according to claim 7, further comprising a Diameter client that is configured with at least one of the overload extension and the audit extension to forward messages received from associated user equipment.

9. The system according to claim 7, wherein said Diameter server is a policy charging and rule function.

10. The system according to claim 7, wherein said Diameter server is a policy decision function.

11. A method for border gateway resource management, comprising:
    performing an audit sequence in response to a trigger, the audit sequence includes clearing media resource ports that are not fully connected by implementing an audit extension to a Diameter protocol;
    detecting an overload status from a overloaded gateway that has taken excess load;
    determining a reduction percentage that corresponds with a percentage of calls that will be blocked; and
    blocking calls routed through the gateway with respect to the reduction percentage by implementing an overload extension to the Diameter protocol;
    wherein determining the reduction percentage is based, at least in part, on available central processing unit memory.

12. The method according to claim 11, wherein said overload status is based, at least in part, on the quality of service offered by the gateway.

13. The method according to claim 11, further comprising redirecting a blocked call to a second gateway.

14. The method according to claim 11, further comprising:
    identifying incoming high priority calls like emergency calls; and
    granting priority for said high priority calls preventing them from being blocked.

15. The method according to claim 11, further comprising disabling said trigger while said gateway is in the overload status.

16. The method according to claim 11, wherein performing an audit sequence in response to the trigger includes said trigger relating to a timer.

17. The method according to claim 11, wherein performing an audit sequence in response to the trigger includes said trigger being based, at least in part, on quality of service.

* * * * *